Dec. 23, 1958
O. A. ITRIA
2,865,463
DETERMINATION OF PROPAGATION CHARACTERISTICS
OF EARTH FORMATIONS
Filed Jan. 19, 1956
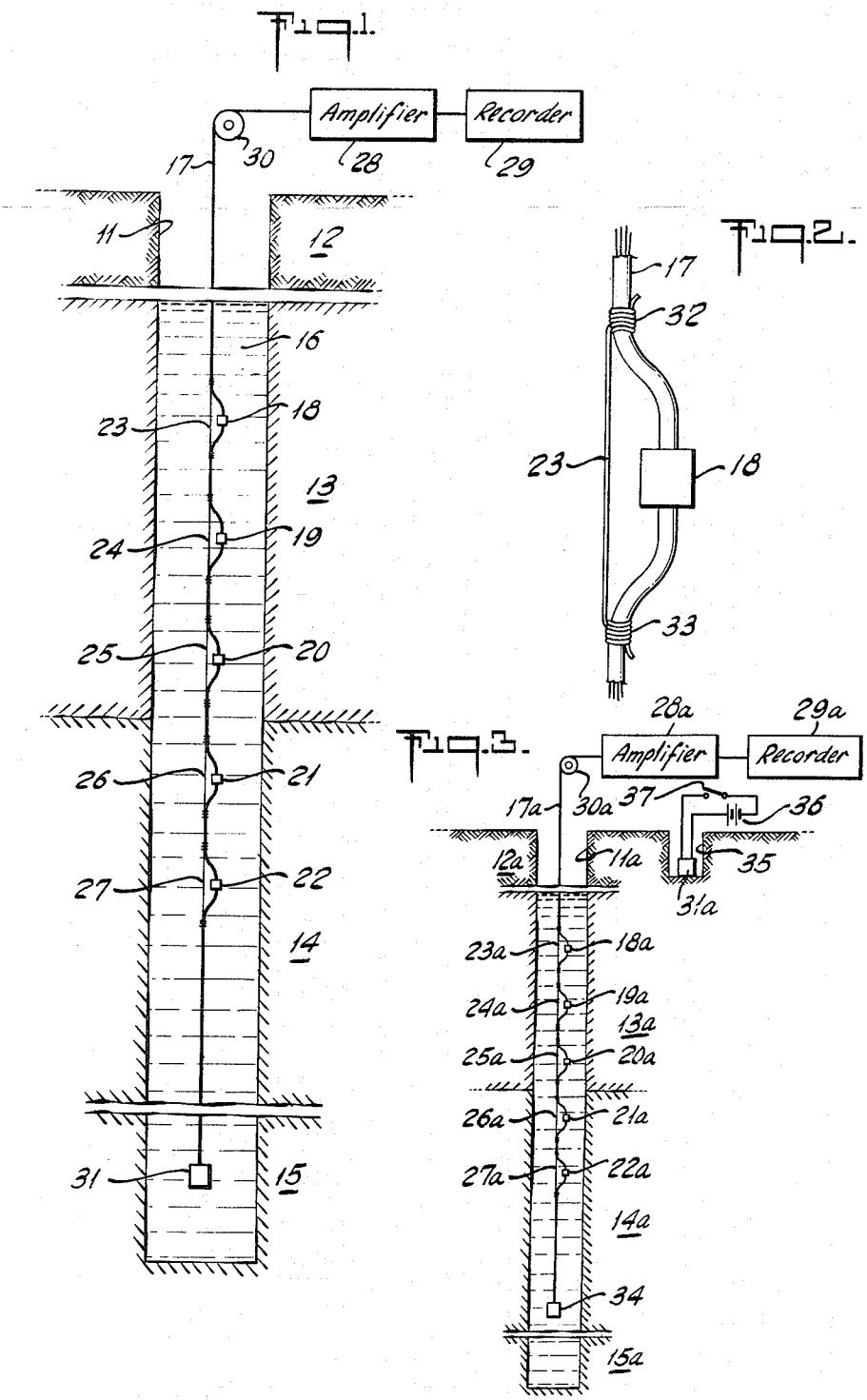

United States Patent Office 2,865,463
Patented Dec. 23, 1958

2,865,463

DETERMINATION OF PROPAGATION CHARACTERISTICS OF EARTH FORMATIONS

Oswald Alfonso Itria, Bellaire, Tex., assignor to The Texas Company, New York, N. Y., a corporation of Delaware Application January 19, 1956, Serial No. 560,088

5 Claims. (Cl. 181—.5)

The present invention relates generally to seismic surveying and, more particularly, to improvements in the determination of the velocity of transmission of an impulse through the earth.

It is a general object of the invention to provide improvements in means for determining the velocity of propagation of a signal through the earth.

In order to analyze the structure of the earth for the presence of mineral deposits and the like, it is often desirable to conduct seismic surveys. During the course of such surveys, it is often desirable to determine the velocity of propagation of an impulse through the earth. One method for determining velocity characteristics of a selected region is known as a velocity survey, wherein a comparatively small explosive charge is detonated at a predetermined location known as the shot point and wherein a plurality of pressure-sensitive detectors are positioned along a bore hole at various successive locations separated from the shot point and from each other by known distances along the bore hole in order to detect an impulse transmitted through the earth from the shot point. By correlation of the time of detonation with the times of arrival of the impulse at the successive detectors and with the distances of separation of the shot point and detectors it is possible to determine the velocity of propagation through the formation adjacent the bore hole.

One form of velocity survey is the so-called up-hole survey wherein the shot point is located below the detectors in the same bore hole. Upon detonation of the charge of explosive at the shot point a seismic pressure pulse is generated which travels through the ground as a pressure wave of condensation or rarefaction. This pressure pulse is intercepted at each pressure sensitive detector and, through well-known principles, the pressure pulse is transformed into a voltage which is then transmitted to a suitable recording device located at the surface of the ground.

In another form of velocity survey the shot-point, i. e., the seismic explosive charge may be located from 10 to 30 feet deep in a shallow offset hole spaced laterally from the main hole by a distance of say, 10 to 30 feet. In this manner the charge will be fired above and slightly to one side of the vertical detector string.

A preferred technique for carrying out velocity surveying has been concerned with the use of a multiple-conductor cable having a plurality of crystal detectors affixed thereto. Preferably, the crystal detectors are equally spaced along the multiple-conductor cable and are formed of barium titanate, or other pressure sensitive transducer material having piezo-electric properties, which may be molded around the cable in order to form an integral unit therewith. The conductors of the multiple-conductor cable are employed to convey separately to the surface equipment the signals received by each of the detectors. In addition to conducting the detector signals to the surface, the cable may also include suitable conductors for detonating the charge when it is located in the same bore hole with the detectors, but below the detectors.

Despite the utility of the aforementioned technique, heretofore those velocity surveys have often been fraught with serious disturbances. In particular, the desired signal perceived by the detector has often been obscured to such an extent that the measured detector output has been rendered virtually useless. Accordingly, it is an object of the invention to provide improvements in up-hole velocity surveying whereby these disturbances are eliminated.

In accordance with the invention, it has been determined that a serious source of interference with the desired signal has been caused by transmission of a portion of the seismic energy from the shot point either directly, i. e., physically through the cable or through the fluid in the bore hole or through the earth and hole fluid to the cable which is used to support and space the crystals in the bore hole. Since this cable is also capable of transmitting a seismic pulse, the pulse thus produced may travel along the cable with a predetermined velocity. Particularly in those instances where the velocity of transmission in the cable is greater than or equal to that of the formation, the impulses produced in the cable by the explosive detonation frequently precedes or arrives concurrently with the impulse transmitted by the earth formation(s) under analysis and thereby tends to mask and obliterate the pertinent data.

Accordingly, and further in accordance with the invention, this undesired interference has been eliminated by the provision of a multiple-conductor cable having a plurality of spaced detectors integrally affixed thereto and wherein a length of flexible cable is affixed to the main cable above and below each detector, thereby bridging the detector in such a manner that the detector itself is freed from tension in the supporting cable.

For additional objects and advantages, and for a better understanding of the invention, attention is now directed to the following description and accompanying drawing. The features of the invention which are believed to be novel are particularly pointed out in the appended claims.

Referring to the drawing:

Figure 1 is a side elevational view, partly in cross-section and partly in block-form, illustrating seismic surveying apparatus in accordance with the invention located within a bore-hole through a series of earth formations;

Figure 2 is a side view, partly in cross-section, illustrating in greater detail a portion of the seismic apparatus shown in Figure 1, and Figure 3 is a side elevational view somewhat similar to Fig. 1, but showing a modification of the apparatus.

Referring now to Figure 1, there is shown a borehole 11 extending through a series of earth formations 12, 13, 14, 15 and containing the usual borehole fluid 16 which may include water, together with other material such as the usual borehole drilling fluid. Suspended within the borehole 11, there is shown a multiple-conductor cable 17 to which is affixed a plurality of pressure sensitive detectors 18, 19, 20, 21, 22. Although five (5) detectors are shown in the illustration, it is to be understood that a greater or lesser number of these devices may be employed. For example, it is conventional in many cases to employ twelve (12) detectors. Each of these detectors comprises a transducer formed of material such as barium titanate which is securely affixed to the cable 17, as by being molded thereto. Each of the detector units 18 to 22 is provided with a suitable conductor within the multiple-conductor cable 17 to convey its output to the surface for utilization. The individual detectors 18–22 are relieved from the supporting tension of the cable 17 by means of respective bridging cable members 23–27. Each of the bridging cable members 23–27 comprises a flexible wire, or the like, of sufficient tensile strength to support that portion of the cable and associated equipment suspended below it in the borehole.

The output of each of the detectors 18 to 22 is conveyed over its appropriate conductor within the cable 17 to an appropriate amplifier 28 located at the surface. The amplifier 28 functions in known manner to enhance the output of the individual detectors 18–22 in order to provide a signal of adequate amplitude to actuate a display device, such as the recorder 29 coupled thereto. The recorder 29 may comprise a multiple trace device including means for indicating the response of each of the individual detectors separately along a common time base.

At the surface, the cable 17 passes over a suitable device, such as the measuring wheel 30, for determining the length of the cable 17 within the borehole 11.

In the embodiment illustrated in Fig. 1, within the borehole 11 and below the detectors 18–22, there is positioned an explosive charge 31 which is preferably affixed to the end of the cable 17, as illustrated. Although less desirable, it is to be understood, of course, that a separate cable (not shown) may be employed for supporting and positioning the charge in the borehole. In any event, means are also provided for conducting an electric signal to the charge 31 for detonating it at a predetermined instant of time. Means are also preferably provided for setting the recorder 29 into operation when the charge 31 is detonated, or just prior thereto. The recorder 29 should preferably indicate the instant of detonation along the same time base against which the recorded impulses are plotted.

Briefly stated, the apparatus illustrated in Fig. 1 may be employed to determine the velocity of transmission of an impulse through the formations adjacent a borehole in the following manner. The charge 31 is lowered into the borehole to a desired depth the detectors 18 to 22 being affixed to the cable 17 at predetermined locations spaced therefrom. The detectors 18–22 may be so spaced and oriented within the borehole that the respective portions of the formation along the traverse of the borehole and lying generally between the individual detectors represents the portions of the formation about which velocity transmission information is desired. In addition, the portions of the formation along the borehole and generally between the shot point 31 and each of the respective detectors 18–22 may also represent areas about which information is desired. Having thus oriented the charge 31 and the detectors 18 to 22, the recorder may be set in operation and the charge detonated to record the shot-time followed by the successive impulses received by the various detectors. The record produced by the recorder 29 in accordance with this technique shows the time of occurrence of the shot followed by the successive times of arrival of the impulse produced thereby in the formation at each of the detectors 18 to 22. Thus, the velocity of transmission may be determined from the shot point to each of the detectors. Alternatively, the time of transmission of the impulse from one detector to the next or any of the following detectors may be determined.

In accordance with the features of the invention, the individual detectors are so mounted within the borehole that they are isolated from impulses transmitted from the shot point through the cable. Nevertheless, the detectors are so disposed that impulses transmitted from the shot point through the formation 13—15 are effectively detected thereby without being masked by the objectional cable transmission heretofore encountered.

Referring to Figure 2, there is shown in greater detail a portion of the cable 17 illustrating how the individual detectors are mounted thereon and nevertheless isolated from impulses transmitted through the cable, per se, by means of the respective bridging members. In Figure 2, the detector 18 is shown bridged by the member 23 which is preferably formed of flexible wire or the like which may be tightly wound about the cable 17 as at the points 32, 33. It is noted that the length of the bridging member 23 is shorter than the effective length of the portion of the cable 17 bridged thereby, viz., that portions between points 32 and 33. Thus, the member 23 supports that portion of the cable 17 that is below it in the borehole 11.

A slightly different embodiment of the invention is illustrated in Figure 3. In that case, the main cable, the detectors or tranducers and the bridging cable members have been given the same reference characters as in Figure 1, but with the suffix "a" added. Thus the cable 17a with the detectors 18a–22a is substantially the same as in Fig. 1 but at the extreme lower end of the cable a weight member 34 is attached in order to facilitate the lowering of the cable and detector string in the hole 11a. The explosive charge 31a is located in a shallow offset hole 35 instead of being attached to the lower end of the cable as in Figure 1. The shot hole 35 is preferably from about 10–30 feet in depth and spaced laterally from the upper end of the hole 11a by a somewhat similar distance, i. e., about 10–30 feet. The charge is shown as connected to a source of electrical supply 36 in series with a suitable firing switch 37. In this embodiment, the operation is very similar to that previously described with the exception that the charge is fired above the detector string rather than below it. By placing the charge in a separate hole, damage to the cable which might be caused by the explosion of the charge is prevented.

While certain specific embodiments have been shown and described, it will be understood that various other modifications may be made without departing from the principles of the invention. The appended claims are, therefore, intended to cover any such modifications within the true spirit and scope of the invention.

I claim:

1. In apparatus for determining the velocity characteristic of an earth formation surrounding a bore hole of the type wherein a multiple-conductor cable is suspended in the bore hole, said cable having a plurality of detectors individually affixed thereto at predetermined spaced locations and wherein each of said detectors is individually coupled to conductor means within said cable, the improvement comprising a bridging member including a flexible wire having its respective ends affixed to said cable on opposite sides of one of said detectors, the effective length of said bridging member being shorter than the bridged portion of said cable including said detector, whereby said bridging member supports that portion of the cable suspended below it in such manner that the bridged detector is freed from tension in the supporting cable.

2. Apparatus for determining the velocity characteristic of an earth formation surrounding a borehole comprising a multiple-conductor cable, a plurality of electro-acoustic transducers individually affixed thereto at predetermined spaced positions thereon, and forming structurally continuations thereof, said multiple-conductor cable being firmly attached to each transducer at opposite extremities of each said transducer, each of said transducers being individually coupled to a separate conductor means within said cable, and a bridging member for each transducer attached to said cable above and below the transducer, said bridging member having a shorter effective length than the combined cable and transducer being bridged for supporting the cable therebelow.

3. Apparatus as described in claim 2 including a seismic explosive charge attached to said cable below the lowermost transducer.

4. Apparatus as described in claim 2 including a weight member attached to the lower end of said cable below the lowermost transducer.

5. The apparatus of claim 2 wherein each of said transducers comprises a piezo-electric detector molded to the cable.

References Cited in the file of this patent
UNITED STATES PATENTS

| | | |
|---|---|---|
| 2,191,120 | Slichter | Feb. 20, 1940 |
| 2,465,696 | Paslay | Mar. 29, 1949 |
| 2,718,930 | Bazhaw | Sept. 27, 1955 |